United States Patent
Weller et al.

(10) Patent No.: US 9,750,261 B1
(45) Date of Patent: Sep. 5, 2017

(54) APPARATUS AND METHOD FOR PREPARING SPHERICAL SHAPED PRODUCTS

(71) Applicant: VEMAG Maschinenbau GmbH, Verden/Aller (DE)

(72) Inventors: Frank Weller, Verden (DE); Heiko Walther, Reer (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 321 days.

(21) Appl. No.: 14/250,406

(22) Filed: Apr. 11, 2014

(30) Foreign Application Priority Data

Apr. 12, 2013 (EP) .................................. 13163618

(51) Int. Cl.
| | |
|---|---|
| A22C 7/00 | (2006.01) |
| A21C 11/10 | (2006.01) |
| A21C 11/16 | (2006.01) |
| A21C 3/04 | (2006.01) |
| A21C 5/00 | (2006.01) |
| A21C 9/08 | (2006.01) |

(52) U.S. Cl.
CPC ............ *A21C 11/10* (2013.01); *A22C 7/0015* (2013.01); *A21C 3/04* (2013.01); *A21C 5/00* (2013.01); *A21C 9/085* (2013.01); *A21C 11/16* (2013.01)

(58) Field of Classification Search
CPC ........... A22C 7/0015; A21C 3/04; A21C 5/00; A21C 9/085; A21C 11/10; A21C 11/16
USPC ............... 425/311, 377, 382 R, 464
See application file for complete search history.

(56) References Cited

U.S. PATENT DOCUMENTS

| | | | | |
|---|---|---|---|---|
| 3,535,735 A | * | 10/1970 | Egee | ...................... A21C 11/16 425/377 |
| 3,797,069 A | | 3/1974 | Von Lersner et al. | |
| 4,948,611 A | * | 8/1990 | Cummins | .............. A21C 11/16 426/503 |
| 5,264,232 A | * | 11/1993 | Campbell | ................ A21C 5/00 425/311 |
| 5,270,070 A | | 12/1993 | Campbell | |

(Continued)

FOREIGN PATENT DOCUMENTS

| | | |
|---|---|---|
| DE | 69015467 T2 | 5/1995 |
| EP | 0404389 A1 | 12/1990 |

*Primary Examiner* — Seyed Masoud Malekzadeh
(74) *Attorney, Agent, or Firm* — Wood Herron & Evans LLP (57) ABSTRACT

Apparatus and process for producing and discharging spherically shaped products from a pasty material. The apparatus includes a feed device for moving the pasty material along a conveyor path, a portioning device connected downstream of the feed device for shaping the pasty material into balls, and a transport device for discharging the balls produced by means of the portioning device. The portioning device has an outlet opening having a plurality of outlets for the balls to be shaped, arranged in mutually juxtaposed relationship so that the delivered products touch each other or are arranged in closely mutually juxtaposed relationship, and the portioning device and the transport device are so arranged relative to each other that regions of the transport device in the transport direction provide an abutment function for the balls which are to be oriented in mutually juxtaposed relationship in a row substantially transversely relative to the transport direction.

12 Claims, 5 Drawing Sheets

(56) References Cited

U.S. PATENT DOCUMENTS

| | | | | |
|---|---|---|---|---|
| 5,356,652 A | * | 10/1994 | Campbell | A21C 5/00 425/311 |
| 7,845,271 B2 | * | 12/2010 | Dietrich | A23P 30/20 99/353 |
| 8,424,452 B2 | * | 4/2013 | Oki | A21C 5/00 99/538 |
| 2010/0206184 A1 | * | 8/2010 | Oki | A21C 5/00 99/538 |

* cited by examiner

APPARATUS AND METHOD FOR PREPARING SPHERICAL SHAPED PRODUCTS

BACKGROUND

The present invention concerns an apparatus and a process for producing spherically shaped products from a pasty material like sausage meat, dough or the like.

The invention concerns, in particular, an apparatus comprising at least one feed device for moving the pasty material along a conveyor path, a portioning device connected downstream of the feed device for shaping the pasty material into balls, and a transport device for discharging the balls produced by means of the portioning device.

Known apparatuses and processes are used in particular for the production of products from a pasty material, wherein a large number of products of the same size and shape are made from the pasty material like for example sausage meat or dough. The products made like for example meat balls or croquettes are frequently to be carried away directly after production thereof by means of a transport device for subsequent further processing or for packaging thereof.

U.S. Pat. No. 3,797,069 or EP Patent No. 0194863 discloses an apparatus for producing three-dimensionally shaped, spherical products from a pasty material, which has a feed device for the material which is to be moved along a conveyor path. Connected or arranged downstream of the feed device is a portioning device, by means of which a plurality of balls are frequently produced at the same time from the unshaped pasty, in particular dough-like, product flow. For that purpose the portioning device has two cutting plates each having a plurality of through apertures, of which one of the plates is displaceably mounted. By virtue of the conveyor movement of the pasty material through the feed device and the relative movement of the cutting plates with respect to each other, spherical products, in particular sausage meat balls, are produced at predetermined time intervals. The meat or dough products produced drop on to a conveyor belt or a conveyor device having transport trays, with which the balls produced are carried away.

On the known apparatuses however, when processing in particular very sticky doughs or also meat products, at the end of the cutting or shaping process by the portioning device, under some circumstances the balls to be produced are irregularly detached from the cutting plates. Irregular detachment then results in a random arrangement of the products on the conveyor belt or in the trays of the conveyor device. The random or disordered arrangement of the balls on the conveyor belt or the trays in turn causes difficulty in regard to further processing, in particular possible packaging, of the spherical products which have been discharged. Product flows which are produced in that way either have to be aligned by hand or they can only be transferred or introduced into the packs intended for same, by using a complicated and expensive multi-tray loader.

Therefore, the object of the present invention is to provide an apparatus and a process for producing and discharging shapable products, with which the discharged products can be advantageously arranged.

SUMMARY

In an apparatus of the above-indicated general kind, the object of the invention is attained in that the portioning device has an outlet opening having a plurality of outlets for the balls to be shaped, arranged in mutually juxtaposed relationship so that the delivered balls touch each other or are arranged in closely mutually juxtaposed relationship, and the portioning device and the transport device are so arranged relative to each other that regions of the transport device in the transport direction provide an abutment function for the balls which are to be oriented in mutually juxtaposed relationship in a row substantially transversely relative to the transport direction.

The invention is based on the realization that the small spacing between the balls, wherein in the best-case scenario the balls are in contact with each other, ensures advantageous alignment. At the same time, that affords an advantageously compact arrangement of the preferably three-dimensionally shaped, spherical products in a formed row of products. In addition, by way of the abutment function according to the invention, spherical products which are made from a very sticky material can be oriented at a low level of structural expenditure in mutually spaced rows with balls which are aligned in mutually juxtaposed relationship approximately transversely relative to the transport direction, and discharged for further processing. In that respect, the preferred use or employment of regions of the transport device for affording the abutment function for the balls which are delivered by way of the portioning device represents a preferred possible option. Subsequent correction or alignment of the products on the transport device by hand is thus advantageously avoided; this giving an advantageously reduced hygiene risk in packaging of the balls made for example from sausage meat or also from dough. The spherical products, which are arranged in mutually juxtaposed relationship in that way with a relatively high degree of accuracy, can then be, for example, relatively easily transferred into packs which can respectively be appropriately associated. To provide the abutment function, it is alternatively possible for example to have an abutment element which is movably mounted and positively controlled in cyclic relationship, wherein the abutment element briefly projects into the path of movement of the balls which are discharged for example with the transport device so that the balls are aligned against the abutment element. The abutment element is then moved out of the path of movement, thereby ensuring unimpeded further transportation of the shaped products.

In the present case in accordance with the invention, the concept of 'arranging the balls in close mutually juxtaposed relationship' is to be interpreted as meaning that the spacing between the outlets of the portioning device, and thus the balls produced, which are arranged in mutually adjacent relationship is smaller than the diameter of the balls produced, preferably being in a region of between 1 and 10 mm, particularly preferably in a region between 1 and 5 mm. That ensures that the balls, which issue at the outlet opening of the portioning device, are arranged as closely as possible in mutually juxtaposed relationship or relative to each other between the portioning device and the transport device or come to lie in that position. The balls are moved out of the region between the portioning device and the transport device, preferably by way of the subsequently shaped spherical products, on to the transport element of the transport device. The balls are also at an advantageously small spacing from each other on the transport element, in which respect two mutually adjacent balls can touch each other in the best-case scenario. The portioning device has in particular any number of outlets, wherein the number is preferably between 3 and 8 outlets on the portioning device. Alternatively, the portioning device has fewer than three outlets or also more than eight outlets.

In a preferred embodiment of the invention, provided between the transport device and the portioning device is a gap which is so adapted that the shaped or discharged balls are at times at least partially arranged therein. The provision of a gap between the portioning device and the transport device arranged downstream in the conveyor direction affords an advantageous possible way of implementing an abutment function on the apparatus according to the invention. The size of the gap between the portioning device and the transport device is preferably adapted to the size of the products to be produced. Preferably, the gap is of a dimension in the region of between ¼ and ¾ of the diameters of the balls produced. After shaping of the balls by the portioning device and discharge thereof in the direction of the transport device, the balls preferably briefly come to lie in the gap between the portioning device and the transport device and are thus aligned in a line and remain in or at the gap for a period of time. The spherical products in the gap are, in particular, only moved on to the transport device by the subsequently produced or shaped products which are delivered in the direction of the transport device. Then the subsequently shaped balls are arranged in the gap between the portioning device and the transport device. During their residence time, the balls preferably each come into contact with portions or regions both of the portioning device and also the transport device.

The portioning device has an outlet opening and the transport device includes a transport element which implements the transport movement, wherein the outlet opening is directly associated with a deflection region of the transport element. By coming into contact with the deflection region of the transport element, the balls issuing from the outlet opening of the portioning device are prevented from being discharged directly from the transport element without alignment of the balls in a row in mutually juxtaposed relationship, which is to be effected beforehand, having been performed. By virtue of the inherent weight of the balls produced, they automatically remain in the gap between the portioning device and the deflection region of the transport element.

Another embodiment of the invention provides that the portioning device and/or the transport device are adapted to be adjustable relative to each other in their height and spacing. That ensures optimum adaptation to the possibly varying dimensions of the balls to be shaped or produced with the apparatus according to the invention. The size of the gap between the portioning device and the subsequent transport device can accordingly be advantageously adjusted, whereby the balls are prevented from dropping through the gap. That permits relatively simple adaptation of the apparatus according to the invention to the shape and the related dimensions of possibly different products which are preferably to be shaped into balls.

Preferably, the outlet opening of the portioning device with its outlets has a heightwise displacement relative to the top side of the transport element of the transport device, thereby ensuring preferably the initially brief stoppage of the balls shaped or produced immediately upstream by the portioning device, at the transport element which is continuously moving. It is only with the production or shaping of the subsequent balls by the portioning device that the balls which are disposed in the gap are pushed or transferred on to the transport element of the transport device. The subsequent balls in turn initially bear only briefly against the transport device and are also only then moved away on to the transport element by the balls produced thereafter. This, therefore, provides for intermittent transfer of the spherical products between the portioning device and the transport device.

Preferably, the conveyor direction of the portioning device, with respect to a horizontally extending plane, is oriented approximately parallel to the transport direction of the transport device, thereby ensuring an advantageously simple transfer of the shaped or produced balls between the various stations of the apparatus according to the invention. In addition in particular alignment of the balls is advantageously simplified as a specifically targeted deflection movement of the shaped spherical products in the horizontally extending plane is avoided. Parallel alignment of the portioning and transport devices further involves the advantage that the gap between those two processing stations of the apparatus according to the invention, being the gap in which the respective balls are briefly arranged or come to lie, can preferably easily be made of a uniform configuration.

The central axis of the outlet opening with respect to a perpendicular section plane extending in the transport direction, relative to the central axis of the transport element, has an angular displacement in a region of 10 degrees below the central axis of the transport element to 40 degrees above the central axis of the transport element. The portioning device, in particular the outlet opening thereof, can preferably be oriented at a predetermined angle relative to the central axis of the transport element, thereby ensuring simplified discharge delivery of the shaped or produced balls to the transport device. The central axis of the outlet opening can preferably be oriented with respect to the in particular horizontally extending central axis of the transport element, in an angular range of between −10 degrees, that is to say below the central axis, and 40 degrees, that is to say above the central axis.

Preferably, the transport device is a continuous conveyor whereby advantageously continuous transport movement of the balls to be discharged from the portioning device can be implemented. The preferably continuously circulating continuous conveyor preferably has an endless belt, which represents an advantageous possible way of providing a transport element of the transport device. The balls shaped from the pasty material like for example sausage meat or dough can be easily transported away with an endless belt, without incurring the risk that the spherical products which are already suitably put into their final shape are deformed or are changed in shape.

In an alternative configuration of the apparatus according to the invention, a transfer means corresponding to the transport device for the balls is associated with the outlet opening of the portioning device, and is preferably adapted to assist with transfer of the shaped balls on to the transport device. That further improves alignment of the shaped balls relative to the transport device. A displacement between the balls, which are to be arranged in particular in a row in mutually juxtaposed relationship on the transport device and which are to be oriented transversely relative to the transport direction, can thus be advantageously avoided. Preferably, with the transfer means, all balls which are directly shaped by the portioning device in a working cycle are transferred uniformly from the outlet opening to the transport device. Preferably, the shaped balls are brought into contact with the deflection region of the transport device in specifically targeted fashion by way of the transfer means and are at least lightly pressed against the transport device. Preferably, the transport device has a circulating conveyor belt, with the top side of which the shaped balls are brought into contact.

Preferably, the transfer means has a preferably rotatable roller body arranged at a spacing above the deflection region of the transport device and/or the gap between the transport device and the portioning device. Preferably, the balls discharged from the portioning device pass directly into contact with the roller body which preferably has an axis of rotation that is oriented horizontally or extends parallel to the deflection axis of the transport element. The rotatable roller body is preferably driven in rotation by means of a drive means associated with the transfer means. The transfer movement of the shaped balls from the outlet opening on to the transport device is ensured by the rotary movement of the roller body. Preferably, the rotary movement of the roller body is matched to the conveyor speed of the transport element of the transport device and/or the delivery speed of the shaped balls by the portioning device. Therefore, the roller body moves at a peripheral speed at its peripheral surface which comes into contact with the shaped products, that is approximately equal to the transport speed of the transport element. To drive the roller body, the transfer means can be coupled by way of a coupling transmission like for example a belt drive to for example a direction-changing roller of the transport device, to transmit a rotary movement.

An embodiment of the invention provides that at its peripheral surface the roller body has one or more profilings preferably extending in the axial direction. The shaped balls are prevented from sliding off along the peripheral surface of the roller body by means of the profilings. That can ensure a uniform transfer movement of the discharged balls, which are preferably in closely mutually juxtaposed relationship or touching each other at the outlets of the portioning device, in the direction preferably of the deflection region of the transport device. The shaped balls can then preferably be exactly arranged in a row in mutually juxtaposed relationship on the transport device transversely to the transport direction thereof, by means of the profilings. The profilings are preferably formed or arranged uniformly distributed over the periphery of the roller body. The profilings provided on the roller body at its peripheral surface can be, for example, grooves or recesses which extend parallel in the axial direction of the roller body and which are arranged distributed at uniform spacings relative to each other over the peripheral surface of the roller body.

In another embodiment, the apparatus according to the invention is distinguished by a filling flow divider for uniform distribution of the pasty material to the individual conveyor passages of the portioning device. The filling flow divider ensures that optimum distribution of mass or weight of the pasty material to the individual conveyor or feed passages of the portioning device is achieved and thus balls of approximately the same weight and same shape occur at the outlets, as a result. The filling flow divider is preferably of a similar configuration to a vane cell pump with a rotor moving in a chamber, wherein the axis of rotation of the rotor is arranged in parallel displaced relationship with the central axis of the chamber and the rotor has displaceable vane elements.

In addition, it is provided according to the invention that the portioning device includes at least one cutting device. The cutting device provides for at least a subdivision of the pasty material passed through the portioning device into balls of predetermined dimensions. Preferably, the portioning device is in the form of a cutting and/or shaping device so that the products produced from the pasty material, in the form of balls, are not only cut off but also at the same time shaped into three-dimensionally shaped bodies. The cutting and/or shaping device makes it possible to produce for example approximately spherical or elongatedly straight products.

For that purpose, the cutting and/or shaping device is equipped with two actively movable cutting and/or shaping plates, by the position of which relative to each other it is possible to control in specifically targeted fashion the shaping of the balls to be shaped or produced from the pasty material. Preferably, both cutting and/or shaping plates are moved at the same time, which, in contrast to just one moved cutting plate, in the case of preferably elongate products, has the advantage of improved spherical shaping of the end regions thereof. In addition, the overall movement of both cutting and/or shaping plates is advantageously reduced in height. Watering is effected between the cutting plates, which simplifies division of the balls to be produced from the unshaped material and in addition the water does not come into contact with the subsequently arranged transport device. The shaping process for the spherical products is preferably controlled on the one hand by way of the movement of the cutting and/or shaping plates relative to each other and, on the other hand, by adaptation of or a change in the delivery amounts or speed of the pasty material through the portioning device.

Each cutting and/or shaping plate has a plurality of directly mutually juxtaposed through apertures. The apertures which are preferably arranged at a spacing of less than 5 mm are provided in both cutting and/or shaping plates respectively and permit the production of balls at a small spacing from each other. In that way, the products obtained, in the transfer from the portioning device to the transport device, can preferably be arranged in a compact row in mutually juxtaposed relationship approximately transversely to the transport direction, with the balls even preferably touching each other. Preferably, there are three or more apertures in a cutting plate. The apertures in the cutting plates have a cutting edge at least portion-wise along their periphery and in particular are of a configuration differing from a circular shape.

The transport device has a delivery region for the rows of products arranged on the transport element, with which there is associated a conveyor device for packagings which are adapted to receive the rows of balls delivered at spacings from each other from the transport element. Advantageously, machine packaging of the products can first be implemented at all by virtue of the balls being advantageously oriented in mutually juxtaposed relationship in a row transversely to the transport direction. Manual interventions which can give rise to a possible hygiene risk are thus avoided in further processing of the products which are preferably produced with an apparatus according to the invention and which are shaped as spheres or balls. The tray-shaped packs, also referred to as trays, are moved by way of the conveyor device which is preferably a constituent part of a tray transport system, into the delivery region of the transport device in which the rows of products are then transferred into the packs. To achieve an advantageously high packing density of the balls within the packs, it is necessary for the conveyor speeds of the conveyor device for the packs and the transport element of the transport device, on which the balls are arranged in mutually spaced rows, to be matched to each other. The transport device involves a conveying or circulating speed which is higher at least by the factor of 3 to 10, in comparison with the conveyor device for the packs.

In accordance with a further preferred configuration of the invention, it is provided that the conveyor device for the packs is a circulatory conveyor which is guided portion-wise beneath the delivery region of the transport device. The use of a circulatory conveyor provides a structurally simple possible option in terms of the configuration of a conveyor device, wherein the circulatory conveyor is, for example, in the form of a circular conveyor, belt conveyor, or chain conveyor. The packs are preferably moved cyclically or are respectively advanced by a predetermined portion of the conveyor distance, with the circulatory conveyor, so that the continuously conveyed balls can be transferred to the packs on the circulatory conveyor. Transfer of the rows of products to the packs is detected, for example, by means of a sensor device coupled to an electronic sensor system or control apparatus which preferably co-ordinates all processes of the apparatus according to the invention with each other. For that purpose, the control apparatus is respectively connected to the feed device, the portioning device, the transport device, and the conveyor device for the packs, by way of signal lines.

The invention further concerns a process for producing and discharging three-dimensionally shaped spherical products from a pasty material like sausage meat, dough or the like materials. In that respect, the present invention attains its object of advantageously aligning the shaped balls with each other, with the process according to the invention, in which a pasty material is moved along a conveyor path, portions of the pasty material are ongoingly shaped into balls, wherein after delivery the balls touch each other or are arranged in closely mutually juxtaposed relationship, the balls are oriented in a row in mutually juxtaposed relationship transversely relative to their conveyor direction, by the produced balls coming into contact at times with an abutment, and then the mutually aligned balls are discharged. With the balls which are preferably delivered from the portioning device being brought into contact with an abutment, the products are firstly oriented in a row in mutually juxtaposed relationship approximately transversely to the transport direction and, after such alignment, are discharged for further processing by means of a transport device. The balls which are aligned with each other in a row of products can touch each other or can be at a spacing relative to each other, that is preferably 10 mm or less.

An advantageous embodiment of the process according to the invention provides that the shaped balls are aligned with each other by the produced balls being brought into contact briefly or at times with a region of the transport device. Bringing the balls into contact with, preferably, the deflection region of the transport device, at which the previously shaped spherical products briefly come to lie; that is to say the balls remain without moving in their position for a predetermined period of time, provides an advantageous simplification in the process as there is no need for an abutment which is to be controlled separately and which in particular is to be operated cyclically.

Preferably, the balls which are aligned at the transport device for discharge on to the transport device are moved by means of the subsequently shaped balls on to the transport device. A further advantageous simplification in the present process is achieved by transferring the aligned spherical products from the portioning device on to the transport device by means of respectively following products. Redundant control processes and parts of the apparatus which are controlled by way thereof, with which the immediately previously oriented, three-dimensionally shaped products are to be moved on to the conveyor belt, can be avoided in that way. The products, which are subsequently delivered at the portioning device and which are preferably in the form of balls, push the balls already arranged in the gap between the portioning device and the downstream transport device on to the transport element of the transport device, or that can already occur during shaping of the subsequent spherical products. Preferably, when discharging the aligned balls, the subsequent balls generate a force almost in the transport direction, which simplifies the transfer of the aligned row of products.

In accordance with an embodiment of the process according to the invention, preferably, the shaped balls are transferred by means of a transfer means from the outlet opening on to preferably the deflection region of the transport device and are brought into contact with the transport element thereof. The controlled transfer of the balls from the outlet opening on to the transport device ensures a simplified and at the same time uniform transfer of the shaped balls to the transport device. That permits precise alignment of the balls which are possibly intended for further processing, in mutually juxtaposed relationship in a row and transversely to the conveyor direction. Preferably, the balls which are shaped by means of the portioning device and which are discharged at the plurality of outlets of the outlet opening are transferred by means of a rotatable roller body which at its outer peripheral surface has profilings for the balls or spherical products. The balls produced are thus laid in the profilings which preferably extend in the longitudinal direction of the roller body, thereby further improving uniform transfer or delivery to the transport device. The rotary movement of the roller body and the transport speed of the transport device are also preferably matched to each other to avoid deformation of the balls produced as they are being transferred.

Preferably, in an embodiment of the invention, the shaped balls are brought into contact with the transport means at a predetermined angle, which is effected for example in dependence on the nature or the composition of the pasty material from which the preferably spherical products are to be shaped.

Preferably, the rows which are oriented at spacings from each other of mutually juxtaposed balls are carried away and then packaged by machine. Machine packaging of the rows of products which are progressively or continuously carried away in succession represents an advantageous option in terms of further processing of the products shaped or produced on the portioning device. The balls, which are moved with the transport device, are discharged or transferred in particular by way of a delivery region of the transport device in packs, the dimensions of which are matched in particular to the dimensions of the balls and thus of the rows of products. Each product row produced preferably has at least three mutually juxtaposed balls. A row of products can include any number of three-dimensionally shaped products, depending on the size of the products to be produced, in which respect a product row having 8 to 10 products is to be handled without any problem.

BRIEF DESCRIPTION OF THE SEVERAL VIEWS OF THE DRAWINGS

A possible embodiment showing further features according to the invention is described in greater detail hereinafter with reference to the accompanying Figures in which.

DETAILED DESCRIPTION

Figure 1:
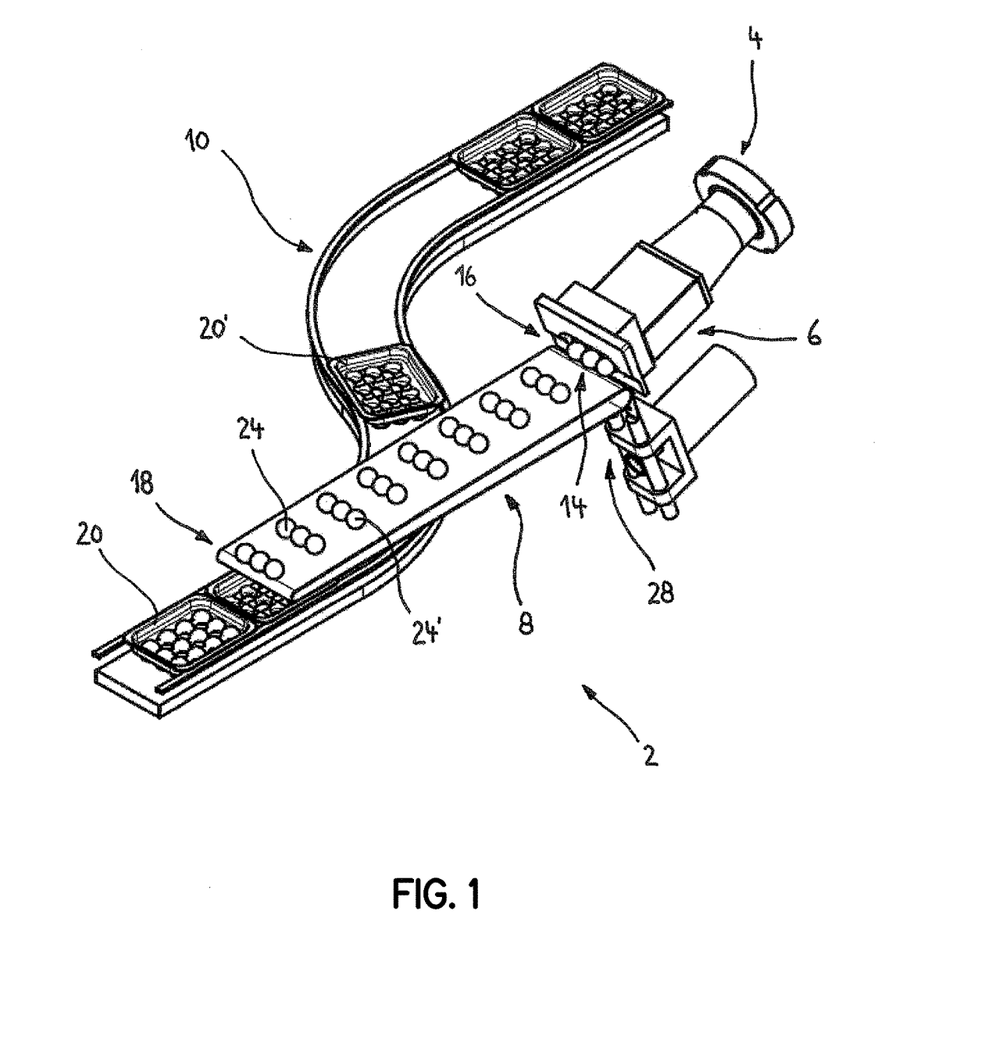
FIG. 1 shows a perspective view of an apparatus according to the invention for producing and discharging shaped balls.

FIG. 1 shows an apparatus 2 for producing and discharging three-dimensionally shaped spherical products consisting of a pasty material in accordance with the present invention. The apparatus 2 has a feed device 4 for the pasty material, a portioning device 6 for shaping a predetermined number of balls from the pasty material, a transport device 8 for discharging the directly produced balls, and a conveyor device 10 for packs accommodating the balls. All constituent parts of the apparatus 2 are held in the arrangement shown here by way of, for example, a frame or a support structure (not shown in greater detail). The pasty material like for example sausage meat or doughs is moved along a conveyor path with the feed device 4. In the portioning device 6, the pasty material is divided to three conveyor passages 12, 12', 12" (FIG. 4) and thus divided into three preferably uniformly subdivided flow portions.

Three-dimensionally shaped balls 24, 24' are produced in a continuous succession from the three flow portions by means of a cutting and/or shaping device 28 projecting into the conveyor passages. At the end the balls 24, 24' are delivered from the outlet opening 14 of the portioning device. The apparatus provides an abutment 16 for orientation of the balls shaped by the portioning device. To constitute the abutment the portioning device 6 and the transport device 8 are so arranged relative to each other that an abutment function is implemented so that the balls form a row of mutually juxtaposedly oriented products preferably approximately transversely to the transport direction. The rows of products, which are respectively produced continuously at predetermined time intervals, are in particular at a uniform spacing relative to each other on the transport device 8, finally being introduced into packs 20, 20' by machine by way of a delivery region 18 of the transport device 8. The packs 20, 20' are positioned by way of the conveyor device 10 beneath the delivery region 18 of the transport device 8 where they are firstly filled and then, after having been filled, are transported away for further processing.

Figure 2A:
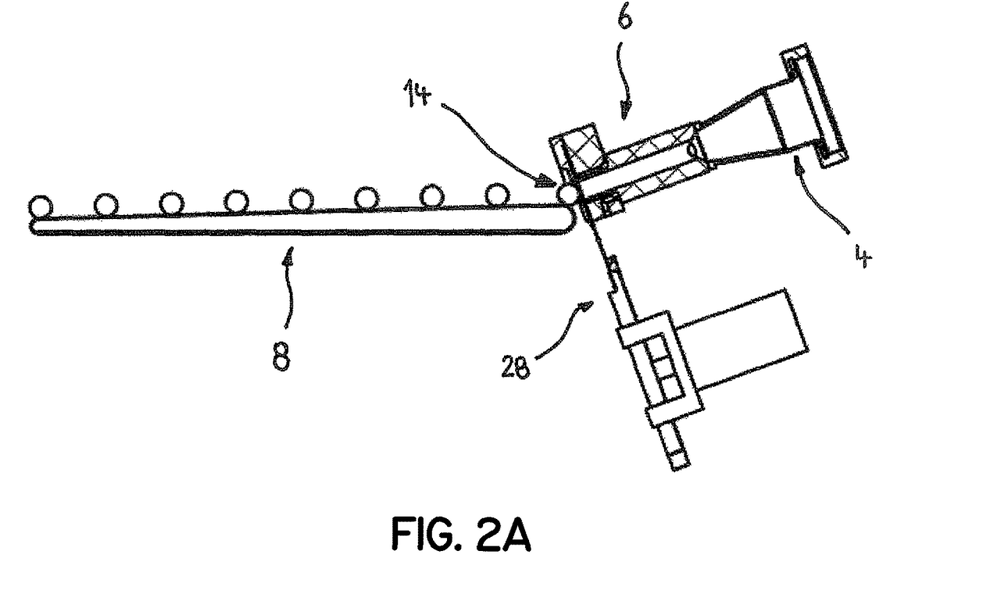
FIG. 2a shows a side view of the apparatus according to the invention as shown in FIG. 1.
Figure 2B:
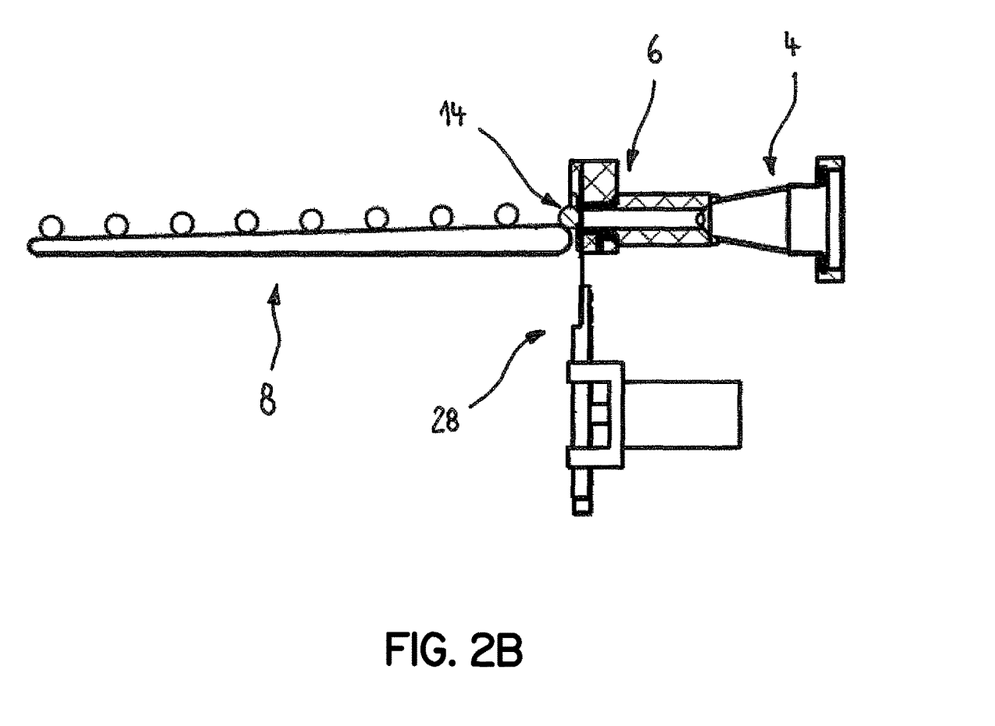
FIG. 2b shows a side view of the apparatus according to the invention in an alternative orientation.

FIGS. 2a and 2b show possible orientations of the portioning device 6 and the transport device 8 relative to each other. The central axis of the outlet opening 14 of the portioning device 6 has an angular displacement of about 20 degrees above the central axis of the transport element 22, in relation to a perpendicular section plane (shown here) extending in the transport direction, in FIG. 2a preferably relative to the central axis of the transport element 22; while in FIG. 2b, it is in an approximately parallel orientation relative to the central axis of the transport element. The two views show orientations by way of example of the portioning device 6 and the transport device 8 relative to each other, which can be disposed in an angular range of 10 degrees below the central axis and 40 degrees above the central axis of the transport element 22.

Figure 3:
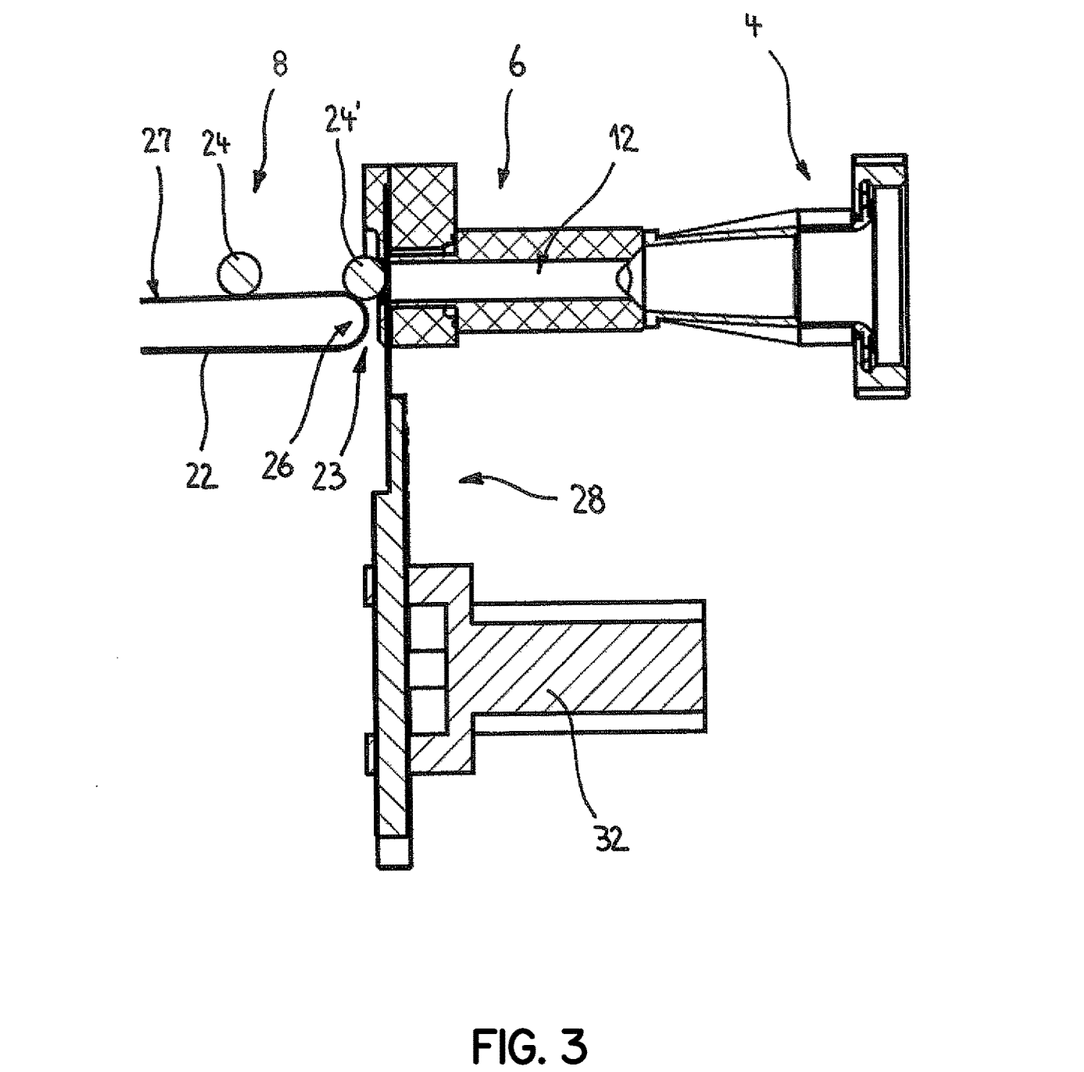
FIG. 3 shows a side view of the apparatus according to the invention as shown in FIG. 2b in section.

FIG. 3 shows a detail view of the feed device 4 and the portioning device 6 in section, which is intended to show the structure and function thereof. Provided between the portioning device 6 and the transport element 22 of the transport device 8 is a gap or space 23, which is so adapted that the shaped balls 24, 24' are arranged at times therein. In that respect, the balls 24, 24' which are respectively disposed in the gap 23 come into contact with a deflection region 26 of the transport device 8 or bear against same until those balls are transferred on to the transport element 8 by the immediately following shaped balls. The portioning device 6 and the transport device 8 are adapted to be adjustable relative to each other in their height and spacing so that a specifically targeted orientation can be implemented for the two parts of the apparatus in dependence on the size and shape of the products to be produced, in the form of balls. Preferably, the outlet opening 14 of the portioning device 6 has a heightwise displacement relative to the top side 27 of the transport element 22 of the transport device. The balls 24, 24' which are delivered from the portioning device and which temporarily lie in the gap 23, in order to be moved on to the top side 27 of the transport element 22, have to overcome a difference in height corresponding approximately to a third of the diameter of the conveyor passage 12. Preferably, the transport device 8 is a continuous conveyor with a transport element in the form of an endless belt.

As FIG. 3 further shows, a cutting and/or shaping device 28 is arranged in an end region of the conveyor passages 12, 12', 12" just upstream of the outlet opening 14 of the portioning device 6 in a part thereof. The cutting and/or shaping device 28 has two cutting and/or shaping plates 30, 30' (FIG. 5) which are movable relative to each other. The cutting and/or shaping plates are moved transversely relative to the longitudinal axis of the conveyor or feed passages 12 to 12" by way of a drive means 32 and thus provide for dividing or cutting off products from the flow portions of pasty material, flowing through the delivery passages.

Figure 4:
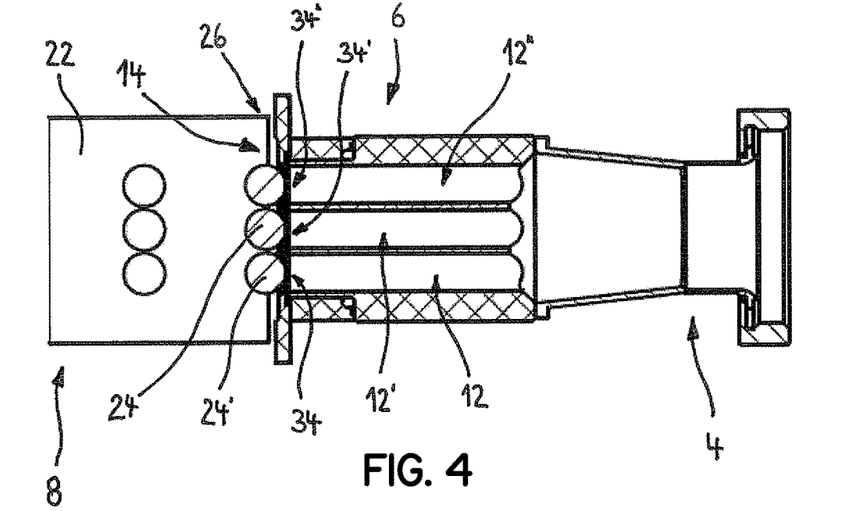
FIG. 4 shows a plan view of the apparatus according to the invention as shown in FIG. 2b in section.

FIG. 4 is a partly sectional plan view of the feed device 4, the portioning device 6, and the transport device 8. The sectional view illustrates the configuration of the portioning device 6 with its conveyor passages 12, 12', 12" in which the pasty material is guided preferably in a uniformly distributed fashion in the direction of the cutting and shaping devices 28 arranged in the end region of the portioning device. Uniform distribution of the pasty material to the feed passages is effected, for example, by a filling flow divider (not shown in greater detail here). The conveyor direction of the portioning device is oriented with respect to the horizontal plane shown, preferably in parallel relationship with the transport direction of the transport device, whereby the balls 24, 24' issuing at the outlets 34, 34', 34" can advantageously be easily oriented at the transport element 22, in particular the deflection region 26 thereof. In that case, the outlets 34 to 34" for the balls 24, 24' to be shaped are arranged in mutually juxtaposed relationship in such a way that the discharged products directly touch each other or are arranged in closely juxtaposed relationship in such a way that their spacing relative to each other is at most 5 mm.

Figure 5:
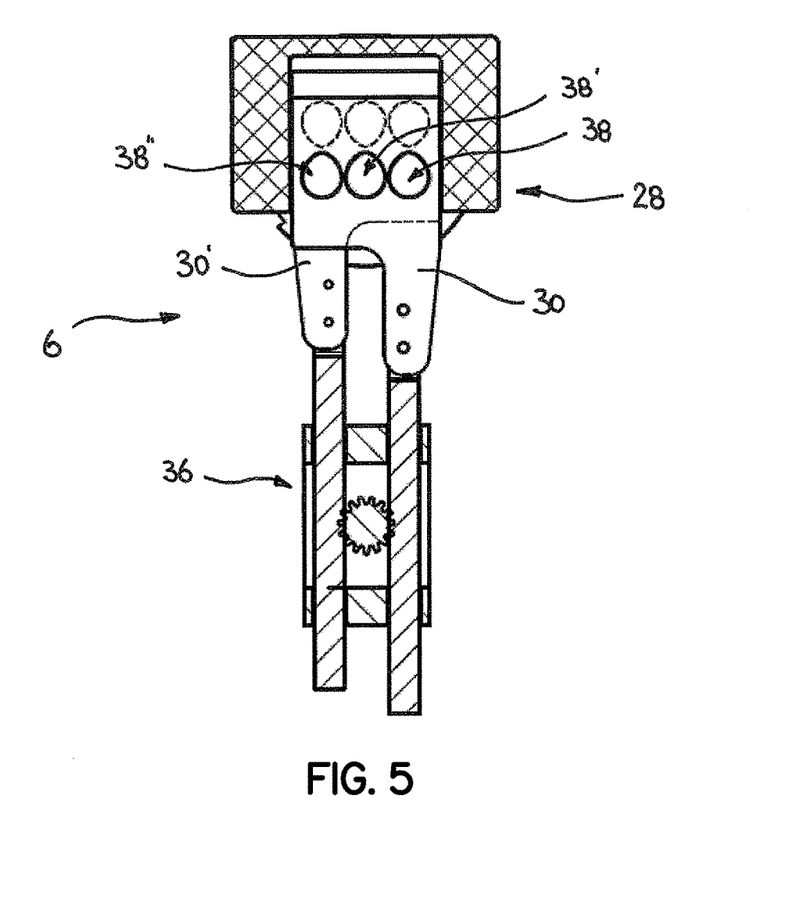
FIG. 5 shows a partial view of a portioning device according to the invention as a sectional view transversely to the transport direction.

FIG. 5 shows a sectional view of the portioning device 6 transversely to the conveyor direction of the pasty material and is intended to show in greater detail the structure and mode of operation of the cutting and/or shaping device 28. The cutting and/or shaping device 28 has two cutting and/or shaping plates 30, 30' which are respectively actively caused to perform an oscillating movement by way of the drive means 32. The drive means 32, which preferably has an electric motor, is connected to the cutting and shaping plates 30, 30' by way of a coupling transmission 36, which for example is in the form of a rack and pinion drive. In dependence on the number of conveyor passages of the portioning device 6, the cutting and shaping plates 30, 30' have a corresponding number of through apertures 38, 38', 38" respectively arranged in directly mutually adjacent relationship on the cutting and shaping plates. A leg between the through apertures is of a width of a maximum of 5 mm. That ensures that the products to be shaped or produced are arranged in a row in closely adjacent relationship. It can also be seen from FIG. 5 that the apertures 38, 38', 38" are of a non-round shape in the cutting plates 30, 30'. The peripheries of the apertures are at least portion-wise in the form of cutting edges.

Figure 6:
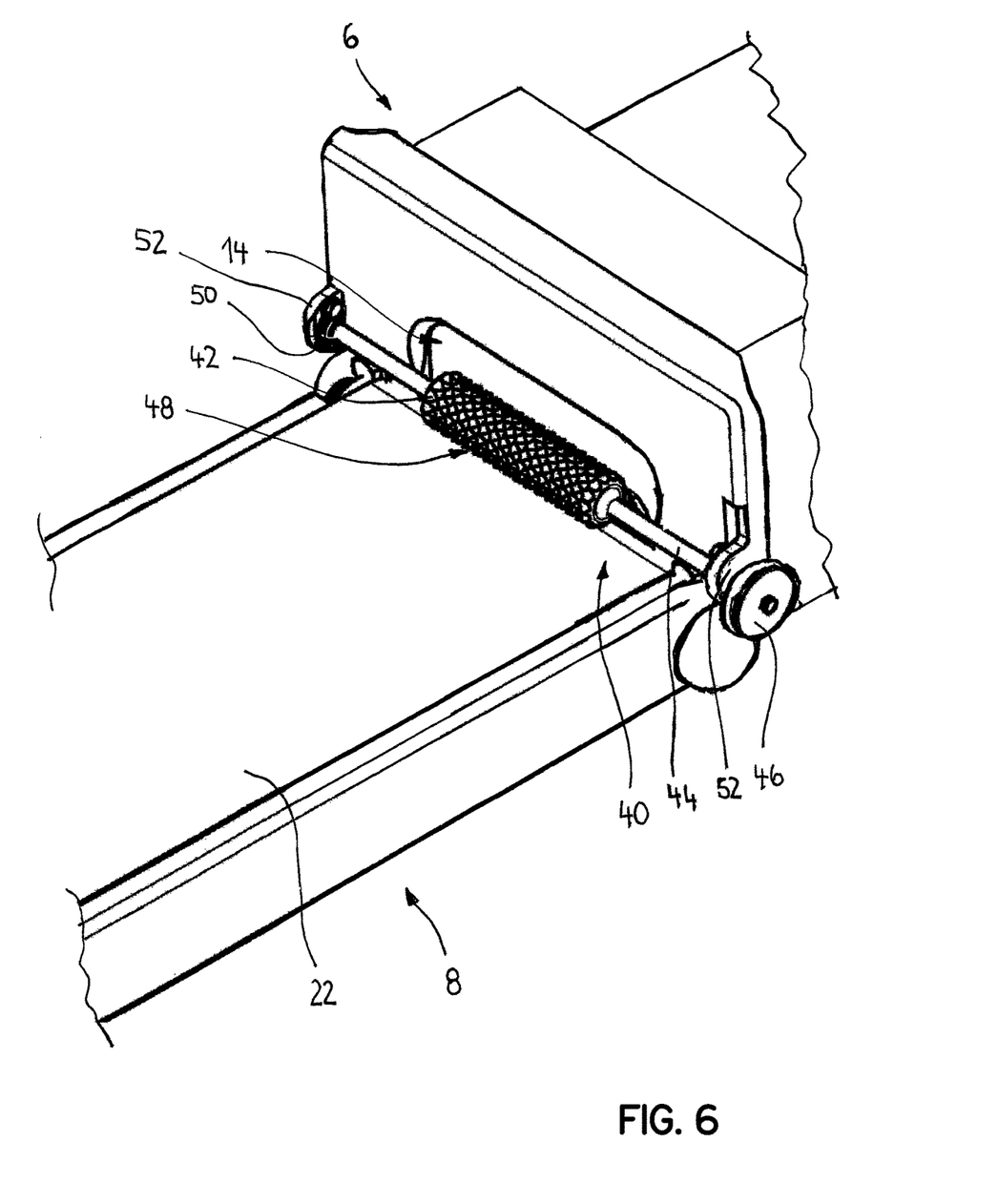
FIG. 6 shows a perspective view of an apparatus according to the invention in accordance with a further embodiment.

FIG. 6 shows an alternative configuration of the apparatus 2 for producing and discharging spherical products. Arranged in the region of the outlet opening 14 of the portioning device 6 is a transfer means 40 with which the balls discharged from the outlets 34, 34', 34" (FIG. 4) are moved in specifically targeted or controlled fashion in the direction of the transport device 8. The transfer means 40 has a roller body 42 arranged on a rotatably mounted shaft 44. The shaft 44 preferably has an axis of rotation which is oriented horizontally or which extends parallel to the deflection axis of the transport element 22. In this embodiment, the roller body 42 is preferably driven by way of a roller 46 arranged at an end of the shaft 44. The roller 46 is connected to a coupling transmission (not shown in greater detail) like a belt drive or the like which can be coupled to a separate drive device or which can be connected to a direction-changing roller of the transport device to transmit a rotary movement. The roller body 42 is arranged, in particular, at a spacing above the deflection region 26 of the transport element 22 and/or at a spacing above the gap 23 (FIG. 3) between the portioning device 6 and the transport device 8. In order to prevent the balls from sliding off along the peripheral surface of the roller body when the shaped balls are being moved or transferred from the outlet opening 14 in the direction of the transport device 8, the roller body has preferably one or more profilings 48 at its peripheral surface. The profilings 48 can be, for example, grooves or recesses on the peripheral surface of the roller body 42, that are arranged parallel to the axis of rotation of the roller body. The shaft 44 of the transfer means 40 is preferably mounted at both ends by way of holders 52 respectively having a rotary bearing 50. The holders 52 are preferably arranged on the portioning device 6. This ensures exact orientation of the transfer means 40 relative to the outlet opening 14 of the portioning device 6 and thus a uniform transfer movement of the shaped balls in the direction of the transport device 8.

The invention claimed is:

1. An apparatus for producing and discharging spherically-shaped products from a pasty material, the apparatus comprising:
    a feed device configured to move the pasty material along a conveyor path;
    a portioning device connected downstream of the feed device, the portioning device configured to shape the pasty material into the spherically-shaped products, the portioning device having an outlet opening with a plurality of outlets for the spherically-shaped products, and the outlets are arranged in mutually juxtaposed relationship so that the spherically-shaped products touch each other or are arranged in a mutually-juxtaposed relationship in a row substantially transversely relative to a transport direction; and
    a transport device, arranged downstream in a conveyor direction from the portioning device, for discharging the spherically-shaped products produced by the portioning device, the transport device including a delivery region configured to move the spherically-shaped products in the transport direction, and the transport device including a deflection region positioned between the delivery region and the portioning device along the transport direction, wherein the outlet opening is directly associated with the deflection region of the transport device,
    wherein the portioning device and the transport device are so arranged relative to each other to define a gap oriented horizontally in the transport direction between the deflection region of the transport device and the outlet opening of the portioning device, with the gap and the deflection region of the transport device causing an abutment function in the transport direction for the spherically-shaped products, the abutment function is configured to include a temporary hold of each row of the spherically-shaped products at the gap to align each row of the spherically-shaped products before further movement is prompted along the transport direction onto the delivery region of the transport device, wherein the gap is of a dimension smaller than a diameter of a respective one of the spherically-shaped products.

2. The apparatus of claim 1, wherein a transfer means corresponding to the transport device for the spherically-shaped products is associated with the outlet opening of the portioning device.

3. The apparatus of claim 2 wherein the transfer means has a rotatable roller body arranged at a spacing above the deflection region of the transport device and/or the gap between the transport device and the portioning device.

4. The apparatus of claim 3 wherein at its peripheral surface, the roller body has one or more profilings extending in an axial direction.

5. The apparatus of claim 1 wherein the delivery region of the transport device has a transport element implementing movement in the transport direction, and the outlet opening of the portioning device is directly associated with the deflection region.

6. The apparatus of claim 5 wherein the outlet opening of the portioning device has a heightwise displacement relative to a top side of the transport element of the transport device.

7. The apparatus of claim 1 wherein the portioning device and/or the transport device are adapted to be adjustable relative to each other in their height and spacing.

8. The apparatus of claim 1 wherein the conveyor direction is oriented approximately parallel to the transport direction.

9. The apparatus of claim 1 wherein the outlet opening has a central axis with respect to a perpendicular section plane extending in the transport direction, the transport device has a central axis, and the central axis has an angular displacement ranges from 10 degrees below the central axis of the transport device to 40 degrees above the central axis of the transport device.

10. The apparatus of claim 1 wherein the portioning device has at least one cutting device having two actively movable cutting and/or shaping plates.

11. The apparatus of claim 1 wherein each cutting and/or each shaping plate has a plurality of directly mutually adjacently-arranged through-apertures.

12. The apparatus of claim 1 wherein the transport device has a delivery region for rows of the spherically-shaped products, and further comprising:
   a conveyor device for a plurality of packagings that are configured to receive the rows of the spherically-shaped products delivered at spacings from each other from the transport device.

* * * * *